Figure 1:
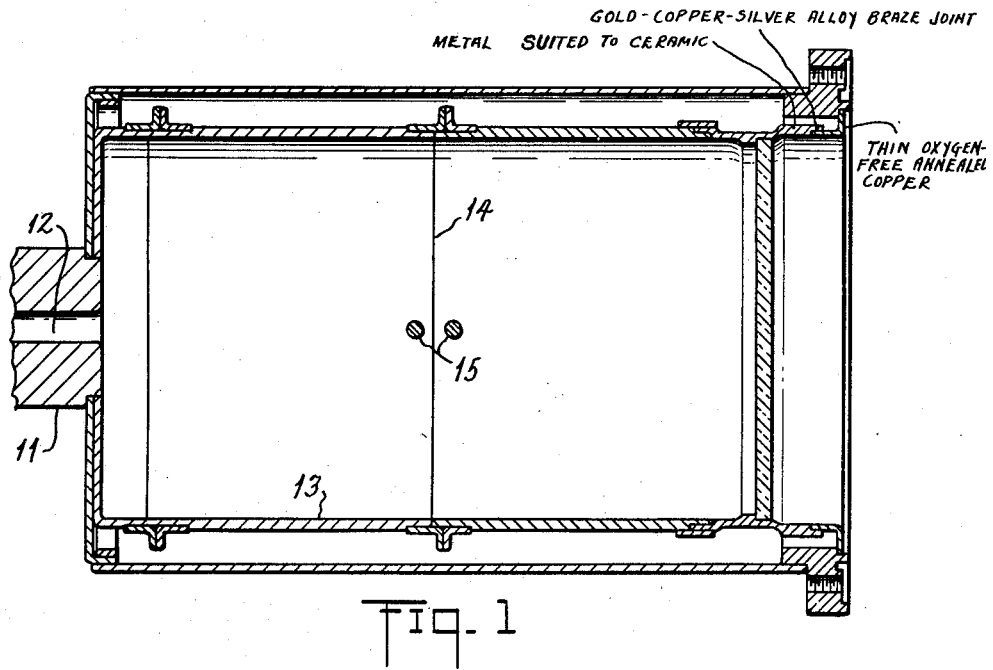

June 30, 1959  E. C. OKRESS  2,892,986
WAVEGUIDE POLARIZATION LOCKING DEVICE
Filed June 11, 1953

INVENTOR.
ERNEST C. OKRESS
BY George Lipkin
Lee J. Huntzberger
ATTORNEYS

United States Patent Office 2,892,986
Patented June 30, 1959

2,892,986

WAVEGUIDE POLARIZATION LOCKING DEVICE

Ernest C. Okress, Montclair, N.J., assignor, by mesne assignments, to the United States of America as represented by the Secretary of the Navy Application June 11, 1953, Serial No. 360,993

3 Claims. (Cl. 333—98)

This invention relates to locking of the plane of polarization of electromagnetic wave energy as the energy is transmitted along a waveguide. More particularly, this invention relates to locking the plane of polarization of electromagnetic wave energy transmitted along a waveguide by neutralizing rotational effects of waveguide discontinuities upon the plane of polarization.

In a rectangular waveguide wherein the mode of transmission is transverse electric, the orientation of the plane of polarization is determined by the geometry of the rectangular waveguide and remains fixed. An arbitrary choice is not possible. The E lines extend between and are perpendicular to the broad sides of the waveguide. Discontinuities along a rectangular waveguide do not have any effect on the orientation of the plane of polarization; the plane of polarization remains perpendicular to the broad sides of the rectangular waveguide.

Discontinuities in waveguides cause reflection and may even cause sparking under high power operation with consequent reduction in the efficiency of transmission. Reflection is evidenced by the magnitude of the standing wave ratio. Sparking may occur where the discontinuities are in the form of sharp-edged projections, cracks or the like.

Not only do discontinuities along circular waveguides cause reflection but in addition they may rotate the plane of polarization when the mode of transmission is the dominant circular waveguide mode. In circular waveguide there is no restraint on the orientation of the plane of polarization. In fact, the plane of polarization can have any orientation, depending upon the character of the discontinuity.

Rotation of the plane of polarization can occur at each of the discontinuities along a circular waveguide. The unpredictable rotations of the plane of polarization of a transverse electric mode such as the $TE_{11}$ of electromagnetic energy through a cylindrical metal waveguide can cause a deviation from a prescribed low impedance and accompanying effects which greatly reduce the efficiency of transmission.

This invention is directed to the use of diametrically disposed straight conduction elements in a substantially circular waveguide. The elements have good conductivity. For illustrative purposes, not intended as limiting, the straight conductor elements may be formed as relatively thin round bars or thin straps. The orientation of the axis or plane of the rod or strap, respectively, fixes the plane of polarization of the electromagnetic energy immediately beyond in the direction of transmission through the waveguide. The plane of polarization beyond either of said elements is perpendicular to the axis or the plane, respectively, of the aforesaid elements. The conductor elements are secured within the waveguide in good electrical contact with the inside surface thereof.

An object of this invention is to lock the plane of polarization in a waveguide.

A further object is to lock the plane of polarization of the $TE_{11}$ mode in a circular waveguide in a preselected angular orientation throughout the waveguide.

A further object is to lock the orientation of the plane of polarization of the $TE_{11}$ mode around circular elbows and at and beyond all discontinuities in a straight circular waveguide.

A further object is to lock the orientation of the plane of polarization of the $TE_{11}$ mode at and beyond all discontinuities in a circular waveguide without introducing losses.

Figures 2, 3:
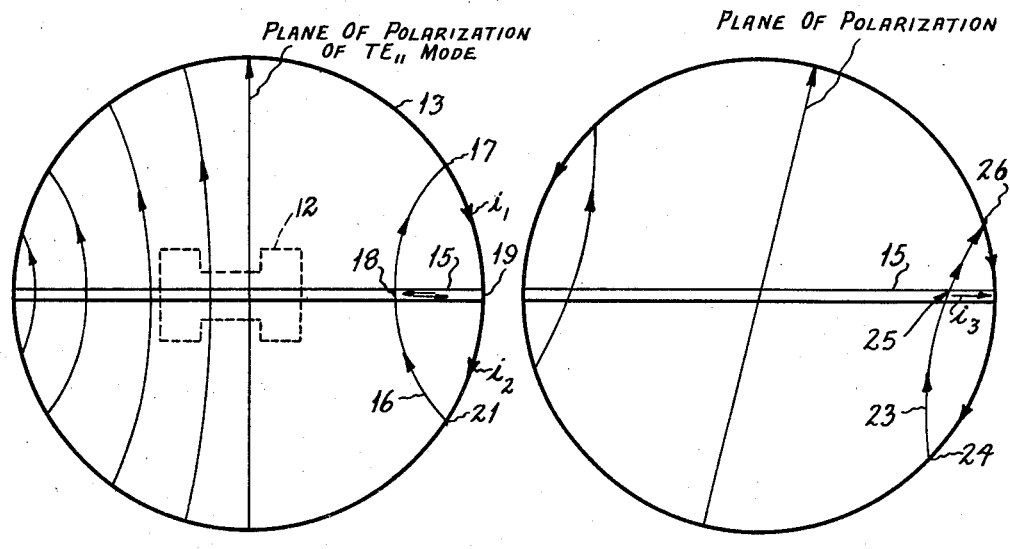

Other objects and many of the attendant advantages of this invention will be readily appreciated as the same becomes better understood by reference to the following detailed description when considered in connection with the accompanying drawings wherein:

Fig. 1 is a sectional view of a portion of a waveguide immediately adjacent to an associated magnetron, not shown, and including a preferred embodiment of this invention, and Figs. 2 and 3 illustrate schematically the effect achieved by the invention.

There is shown in Fig. 1 a short section 13 of circular waveguide immediately adjacent to the outlet of a magnetron, not shown. The electromagnetic energy generated in the magnetron enters the waveguide section 13 at constricted inlet 12 through an H transformer 11. The quarter wavelength long H transformer is characterized by an H-shaped opening in cross section; it functions conventionally as a means of coupling the magnetron, not shown, and the waveguide 13. An H transformer is characterized by an additional feature, namely, it fixes the direction of the electric field of the electromagnetic energy input to the waveguide 13 from the magnetron. The plane of polarization of the dominant $TE_{11}$ mode of the energy issuing from the H transformer 11 into the waveguide 13 is always perpendicular to the closely spaced faces of the H transformer, which form the crossbar of the H. Since any unsymmetrical discontinuity not in the plane of incident polarization disturbs the orientation of the plane of polarization of the energy within a circular waveguide, the plane of polarization in waveguide 13 adjacent its inlet 12 rotates to a different orientation where the energy passes the butt joint 14 having such a discontinuity. The butt joint with an extended gap in a normal current path of the mode is selected as illustrative of one type of discontinuity. The present invention also may be used to neutralize effects of dents, or other stray effects.

The rotational effects of the discontinuity represented by butt joint 14 with extended gap in the manner described is effectively neutralized through the use of rods 15. If the butt joint 14 were perfect and the waveguide ideally round the rods 15 would not be necessary since a perfect butt joint makes the waveguide appear continuous to the energy passing through. The pair of round conducting rods 15 are secured within the waveguide 13 by soldering or equivalent so as to make good electrical contact with the inside surface of the waveguide. One rod is provided for each side of the butt joint. As is more clearly shown in Fig. 2 the rods 15 are mounted transverse to the axis of the waveguide 13 and within the diametrical plane that is perpendicular to the desired plane of polarization of the dominant $TE_{11}$ mode.

As seen in Fig. 2, when rod 15 is perpendicular to the plane of polarization of the $TE_{11}$ mode it has substantially no effect upon the electromagnetic energy that is transmitted along the waveguide. To illustrate this one E line 16 is considered. Because of the difference of potential between the points 17 and 18 a skin current $i_1$ flows between the said two points along the surface of the waveguide and between the points 18 and 19 of the rod 15. In similar manner the difference of potential between the points 18 and 21 cause an equal current $i_2$ to flow in the rod 15 between points 18 and 19 but opposite in direction to the direction of flow of the current $i_1$. Hence under these conditions the resultant current flow in the rod 15 is zero. The only net skin current flow takes place along the surface of the waveguide, the same as would happen in the absence of rod 15.

In Fig. 3 there is schematically illustrated the effects of the rod 15 when the plane of polarization of incident wave is not perpendicular thereto. The E line 23 in Fig. 3 corresponds to the E line 16 in Fig. 2. Because the plane of polarization of the incident wave is not perpendicular to the locking bar 15, the difference of potential between the points 24, 25 is greater than the difference of potential between the points 25, 26. Therefore a resultant current $i_3$ flows in the rod 15. The effects of this current flow in the locking bar 15 is to cause a reflection of the incident wave. Therefore whenever the electromagnetic energy passes a group of coplaner locking bars 15 its plane of polarization is oriented perpendicular to the axis of the locking bars 15, the remainder is reflected.

There is no reflection due to the presence of the rod 15 if the diameter of the rod 15 is much smaller than the inside diameter of the waveguide 13. For example where the ratio of diameters is 1 to 25 there is substantially no reflection due to the presence of the rod 15. The rod 15 is of a material having good conductivity and makes good electrical contact with the inside surface of the waveguide 13 so that the current flow from the rod 15 to the waveguide wall, when the plane of polarization is not perpendicular to the rod 15, will not cause sparking at the joints.

To insure against any rotation of the plane of polarization of the dominant $TE_{11}$ mode in a round elbow or length of bent circular waveguide a series of coplaner rods may be used along its entire length. The spacing of the rods should be such as to prevent spurious resonances in a predictable manner.

Though this description has been confined to round rods this is not to be construed in a limiting sense. For example instead of using rods thin straps may be used. The transverse edges of the straps are rounded off so as not to introduce high voltage gradient thereto. As pointed out previously the rods or straps may be employed to neutralize the effects of other types of discontinuities and is not limited for use immediately adjacent butt joints.

Obviously many modifications and variations of the present invention are possible in the light of the above teachings. It is therefore to be understood that within the scope of the appended claims the invention may be practiced otherwise than as specifically described.

I claim:

1. An improved waveguide constructed and arranged to lock the plane of polarization of the dominant mode of electromagnetic wave energy transmitted along said waveguide, said improved waveguide comprising a plurality of lengths of substantially circular waveguide sections fixedly joined together end to end, an H matching transformer secured to one end of said waveguide and adapted to be joined to the outlet of a magnetron, a plurality of thin straight conductors diametrically disposed in said waveguide, one of said conductors on each side of and in close proximity to each joint and terminating at each end thereof in electrical contact with the inside surface of said waveguide, the conductors on opposite sides of each joint being parallel to each other and all of said conductors being parallel to the space forming the horizontal of the H transformer whereby the plane of polarization of the energy input to said waveguide is locked by said thin conductor means.

2. A waveguide construction which will lock against rotation the plane of polarization of a selected mode of electromagnetic wave energy transmitted along the waveguide, which comprises lengths of tubular waveguide sections of circular cross section and electrically conducting material, coupled together and approximately abutting end to end, and fixed against relative rotation, and a pair of substantially straight, parallel electrical conductors, each of very small transverse cross section and very thin in a direction crosswise of the length of the guide, disposed diametrically across the interior of said guide in directions at right angles to the direction of the electrical field of any wave energy moving along said guide, each of said conductors being electrically connected at both of its ends to the wall of said guide, and said conductors being disposed at opposite sides of but in close proximity to the joint between said abutting ends of said sections, the space between said conductors being unobstructed.

3. The construction as set forth in claim 2, wherein one of said sections at its end remote from said straight conductors is closed but with a wave inlet passage therein opening into said remote end of a section and of H shape, with the cross bar part of the H disposed substantially diametrically of said one guide section and parallel to said conductors.

References Cited in the file of this patent

UNITED STATES PATENTS

| | | |
|---|---|---|
| 2,425,345 | Ring | Aug. 12, 1947 |
| 2,438,119 | Fox | Mar. 23, 1948 |
| 2,555,349 | Litton | June 5, 1951 |
| 2,628,278 | Zaleski | Feb. 10, 1953 |

FOREIGN PATENTS

| | | |
|---|---|---|
| 732,423 | Germany | Mar. 3, 1943 |
| 890,924 | France | Nov. 19, 1943 |